United States Patent
Hahlweg et al.

(10) Patent No.: US 7,593,813 B2
(45) Date of Patent: Sep. 22, 2009

(54) NAVIGATION SYSTEM AND METHOD FOR OPERATING A NAVIGATION SYSTEM

(75) Inventors: Cornelius Hahlweg, Hamburg (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 10/514,997

(22) PCT Filed: Nov. 22, 2003

(86) PCT No.: PCT/DE03/03878

§ 371 (c)(1),
(2), (4) Date: Nov. 19, 2004

(87) PCT Pub. No.: WO2004/048894

PCT Pub. Date: Jun. 10, 2004

(65) Prior Publication Data

US 2005/0165539 A1   Jul. 28, 2005

(30) Foreign Application Priority Data

Nov. 27, 2002   (DE)   ................................. 102 55 329

(51) Int. Cl.
*G01C 21/34*   (2006.01)
(52) U.S. Cl. ............. 701/209; 340/995.12; 340/995.18; 340/995.19; 342/357.13; 345/7
(58) Field of Classification Search ................ 701/209, 701/210, 201, 202; 340/995.12, 995.23, 340/995.19, 990, 995.18; 342/357.13; 345/7; *G01C 21/34*
See application file for complete search history.

(56) References Cited

U.S. PATENT DOCUMENTS 5,790,975 A * 8/1998 Kashiwazaki et al. ....... 701/208
5,899,955 A * 5/1999 Yagyu et al. ................. 701/209
5,931,888 A * 8/1999 Hiyokawa .................... 701/208
5,944,768 A * 8/1999 Ito et al. ...................... 701/200

(Continued)

FOREIGN PATENT DOCUMENTS

DE   100 09 149   3/2001

(Continued)

OTHER PUBLICATIONS

Patent Abstract of Japan, vol. 015, No. 119 (P-1183), Mar. 22, 1991.

*Primary Examiner*—Tuan C To
(74) *Attorney, Agent, or Firm*—Kenyon & Kenyon LLP

(57) ABSTRACT

A navigation system for a motor vehicle includes at least one storage device, at least one navigation map being stored on each storage device, which is read out using a reading device. Associated with the reading device is a changeover device for exchanging storage devices that are to be read out by the reading device. A navigation map and information regarding the instantaneous position of the motor vehicle are displayed to a vehicle occupant via a display device. A control device for the changeover device controls the changeover device so that a point in time for changing over the storage device is identifiable so that during the changeover operation of the storage device, a deviation of the motor vehicle from the route segment currently being traveled is improbable based on the current navigation data of the motor vehicle.

6 Claims, 2 Drawing Sheets

U.S. PATENT DOCUMENTS

| | | | |
|---|---|---|---|
| 6,038,507 A * | 3/2000 | Miyano | 701/202 |
| 6,219,614 B1 * | 4/2001 | Uchigaki et al. | 701/211 |
| 6,438,489 B1 * | 8/2002 | Greif | 701/209 |
| 6,448,908 B1 * | 9/2002 | Hijikata | 340/995.19 |
| 6,778,904 B2 * | 8/2004 | Iwami et al. | 701/211 |
| 6,868,334 B2 * | 3/2005 | Nakane et al. | 701/208 |
| 2001/0054134 A1 * | 12/2001 | Nagatomo et al. | 711/163 |
| 2003/0060975 A1 * | 3/2003 | Fukushima et al. | 701/209 |

FOREIGN PATENT DOCUMENTS

| | | |
|---|---|---|
| DE | 100 38 343 | 8/2001 |
| EP | 0 798 539 | 10/1997 |
| EP | 1 092 952 | 4/2001 |
| JP | 03 007983 | 1/1991 |

* cited by examiner

NAVIGATION SYSTEM AND METHOD FOR OPERATING A NAVIGATION SYSTEM

FIELD OF THE INVENTION

The present invention concerns a navigation system for a motor vehicle, and a method for operating a navigation system.

BACKGROUND INFORMATION

German patent documents nos. 100 09 149 and 100 38 343 discuss methods for coding and decoding objects in a traffic route network. With the aid of these methods, geographic objects of any complexity may be referenced and imaged in a navigation system. With these methods, transition points between different navigation maps may be found to enable a changeover between two navigation maps.

Hitherto, however, it is believed that no solution has been known from the existing art with which the changeover between two navigation maps can be performed easily and reliably.

Proceeding therefrom, the exemplary embodiment and/or exemplary method of the present invention is to provide an improved navigation system for a motor vehicle and an exemplary method for operating a navigation system.

This problem may be solved in that the navigation system cited initially is developed by way of the features of the exemplary embodiments and/or exemplary method described herein.

According to the exemplary embodiment and/or exemplary method of the present invention, the point in time for changing over the navigation maps is selected in such a way that during the changeover operation, a deviation of the motor vehicle from the route segment currently being traveled is improbable based on the current navigation data of the motor vehicle. This ensures that during the changeover operation, no data necessary for modification of the navigation route need to be displayed to the vehicle occupant. This increases destination guidance reliability.

According to an exemplary embodiment and/or exemplary method of the present invention, this is done by ascertaining, from a navigation route of the motor vehicle ascertained by the navigation system, a route segment of the navigation route that is free of turns. From a length of the turn-free route segment and from a maximum speed permissible for that route segment and/or the current vehicle speed, an expected travel time of the motor vehicle on the route segment is then ascertained. This ascertained travel time of the motor vehicle is compared with a time necessary for the changeover operation between the navigation maps (data loading, position finding on the new navigation map, route search, etc.), including the storage device changeover operation that may be necessary, and the changeover operation is initiated when the ascertained travel time of the motor vehicle on the route segment is greater than the time necessary for the changeover operation. This permits a reliable changeover between the navigation maps and memory device(s), with no negative effect on destination guidance.

DETAILED DESCRIPTION

Figure 1:
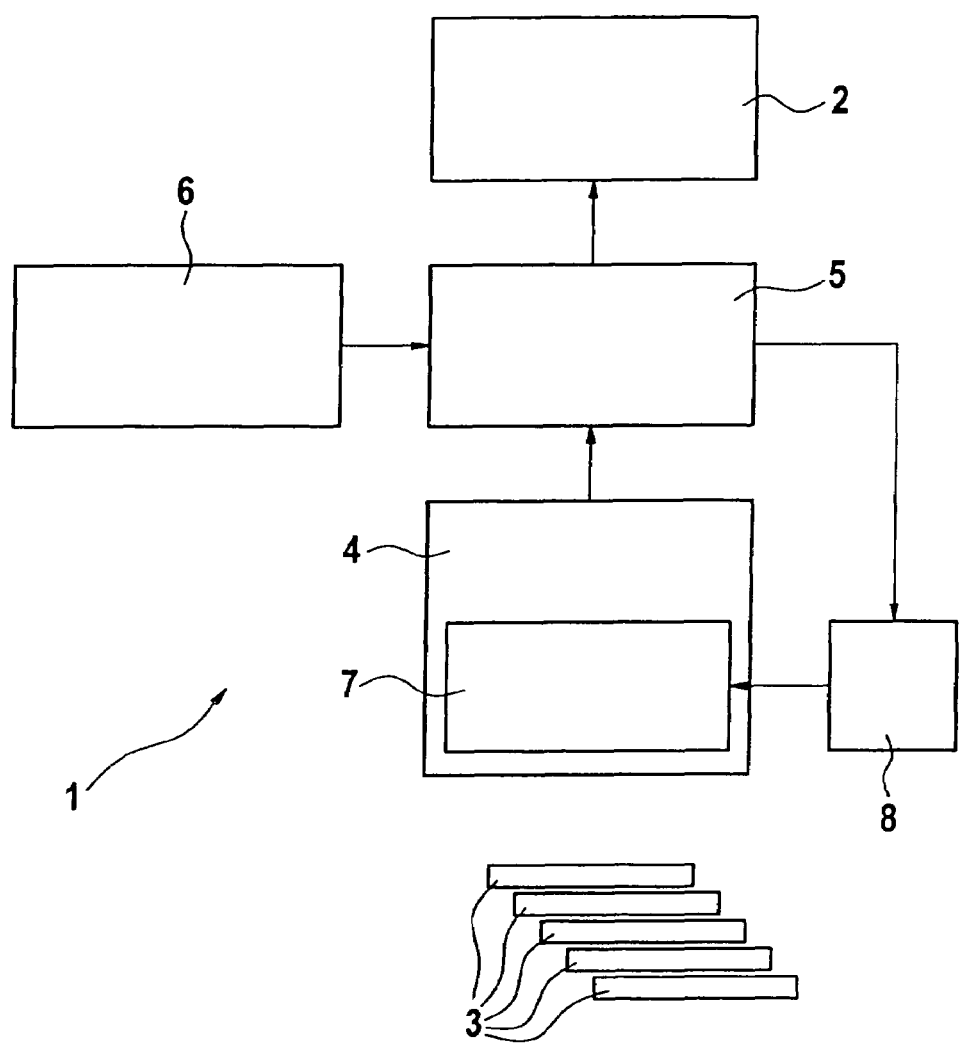
FIG. 1 shows a highly schematic block diagram of the navigation system according to the exemplary embodiment of the present invention.

FIG. 1 is a highly schematic block diagram of a navigation system 1 according to the present invention for a motor vehicle. With the aid of such a navigation system 1, a navigation map as well as instantaneous navigation data of a motor vehicle are displayed to a vehicle occupant on a display device 2 of navigation system 1. The navigation maps are stored on storage devices 3. One navigation map may be stored on each storage device 3. Storage devices 3 can be, for example, CD-ROMs or hard disk drives. Storage devices 3 are read out by a reading device 4 of navigation system 1. The data read out via reading device 4 are conveyed to a processing device 5 of navigation system 1. The current navigation data of the motor vehicle, ascertained with the aid of a location device 6, are also conveyed to processing device 5. In processing device 5, the current navigation data of the motor vehicle are matched on the navigation map that is stored on memory device 3 currently being read out by reading device 4. The navigation map, and the position of the motor vehicle matched on the navigation map, are then displayed on display device 2.

Reading device 4 furthermore encompasses a changeover device 7. Storage devices 3 to be read out by reading device 4 can be changed over with the aid of changeover device 7. This is because when the motor vehicle, as a result of its motion, moves out of the region of the navigation map that is stored on storage device 3 currently being read out, a changeover must be performed to a new storage device 3 on which the next navigation map is stored.

According to the exemplary embodiment and/or exemplary method of the present invention, a control device 8 is associated with changeover device 7. With the aid of control device 8, a point in time for changing over a storage device 3 as to reading device 4 is controlled in such a way that during the changeover operation of storage device 3, a deviation of the motor vehicle from the route segment currently being traveled is improbable. This ensures that no information regarding a modification of the navigation route needs to be displayed to the vehicle occupant during the changeover operation. The changeover operation then proceeds reliably and in a manner unnoticed by the vehicle occupant.

Figure 2:
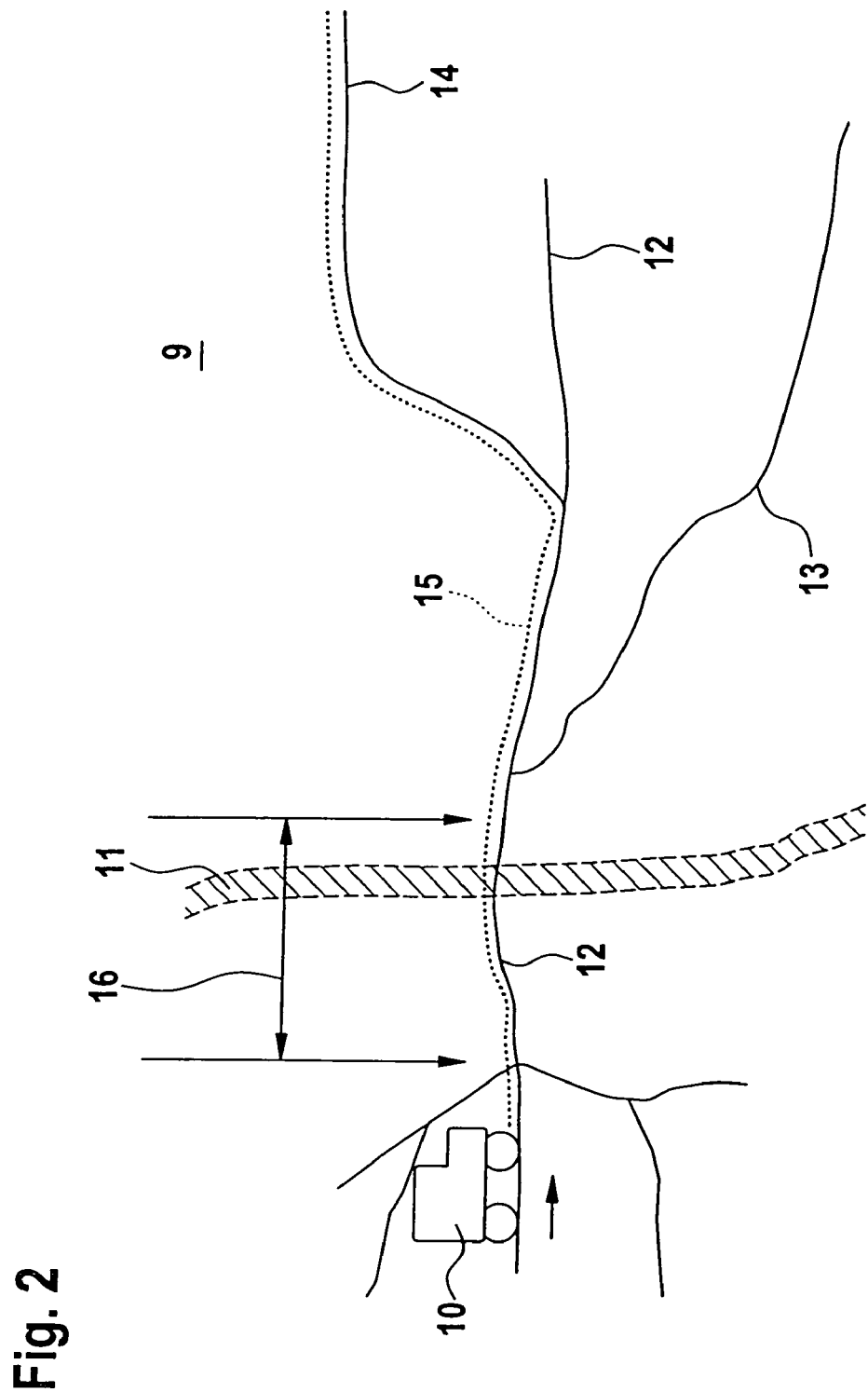
FIG. 2 shows a schematic segment of a topographical map, to illustrate the exemplary method according to the present invention.

The exemplary method according to the present invention for controlling navigation system 1 is explained in detail below with reference to FIG. 2. FIG. 2 thus shows a navigation map 9, displayed on display device 2, with a position of a motor vehicle 10 matched on navigation map 9. The situation depicted in FIG. 2 refers, for example, to an operation depicting an imminent border crossing by motor vehicle 10 from the territory of one country to the territory of a neighboring country. A border 11 is thus depicted in FIG. 2.

In the exemplary embodiment of the present invention depicted in FIG. 2, the navigation map for the territory of the country in which motor vehicle 10 is presently still moving is stored on one storage device, whereas the navigation map for the territory of the neighboring country is stored on a different storage device. When motor vehicle 10 crosses border 11, a changeover of storage device 3 must therefore be performed by navigation system 1.

Depicted on the navigation map shown in FIG. 2 are several roads 12, 13, 14 that extend along navigation route 15 (depicted in FIG. 2 with dotted lines) of motor vehicle 10. In the exemplifying embodiment depicted in FIG. 2, motor vehicle 10 is therefore intended to move along road 12 until the junction with road 14 is reached, and at that junction motor vehicle 10 is intended to turn onto road 14. While navigating on road 12, motor vehicle 10 crosses border 11, the result of this being that a changeover of storage devices 3 in navigation system 1 must be performed.

According to the exemplary embodiment and/or exemplary method of the present invention, a point in time for changing over the navigation map, i.e. the corresponding storage device 3, on which navigation data for the particular geographical region detected are stored, is selected in such a way that during the changeover operation, a deviation of motor vehicle 10 from road 12 currently being traveled is improbable or impossible based on the current navigation data of motor vehicle 10.

For that purpose, navigation system 1 ascertains, from the ascertained navigation route along road 12 on which motor vehicle 10 is moving as it crosses the border, a route segment 16 that is free of turns. Consequently, as motor vehicle 10 passes a junction between different roads while navigating along road 12, the navigation system thus identifies, based on that junction, the turn-free route segment 16 lying ahead in the motor vehicle's travel direction. A "turn-free route segment" is to be understood as a route segment in which there is no possibility of deviating, e.g. as a result of a junction of intersecting roads, from the route being traveled. From the corresponding length of turn-free route segment 16 and from a permissible maximum speed applicable to that route segment, navigation system 1 ascertains a navigation time of motor vehicle 10 on that turn-free route segment 16.

The ascertained navigation time is thus a theoretical minimum navigation time that motor vehicle 10 needs in order to travel route segment 16 while exploiting the permissible maximum speed. The ascertained navigation time of motor vehicle 10 is compared by control device 8 with a time required for the changeover operation of storage device 3. If the ascertained navigation time 10 of motor vehicle 10 is greater than the time required for the changeover operation, the changeover operation for storage device 3 is initiated by control device 8. This ensures that the changeover operation of storage device 3 can definitely be performed while turn-free route segment 16 is being traveled.

Once storage device 3, and therefore the navigation map, has been changed over, the position of motor vehicle 10 matched using the old navigation map is used for placement of the motor vehicle's navigation data onto the new navigation map. As an alternative to this, it is also possible for the navigation data of motor vehicle 10 to continue to be coupled in "blind" fashion during the navigation data changeover operation, using the data ascertained by location device 6. In this case, the position of motor vehicle 10 that continued to be matched during the changeover operation is used, after the changeover operation, for placement of the motor vehicle's navigation data onto the new navigation map. This operation is repeated until the navigation data of motor vehicle 10 can be placed on the new navigation map.

In the exemplary method, the navigation unit checks, even before the actual changeover, whether the vehicle position is present on the new navigation map. Only when that is the case is the above-described switchover mechanism then activated. This ensures that the switchover occurs only when the vehicle is present on the new map, and a route can therefore be calculated.

In a further development, in the case of a positive check result (vehicle position is within the map=On Map), map data are loaded in the background from the new navigation map into working memory, and the processing unit matches the vehicle position onto the new map data. As soon as a matched vehicle position exists, the above-described switchover operation is activated. This ensures that the switchover occurs only when it is already certain that a vehicle position on a digitized road has been found.

The navigation system and exemplary method according to the present invention thus provide a so-called "on-the-fly" transition between different navigation maps, that can be effected simply on the basis of the location functions that are in any case performed by the navigation system. An application for the exemplary embodiment and/or exemplary method of the present invention is represented by a navigation system having a CD changer that contains several CDs with correspondingly different navigation maps.

A list of reference characters is as follows:
1 Navigation system
2 Display device
3 Storage device
4 Reading device
5 Processing device
6 Location device
7 Changeover device
8 Control device
9 Navigation map
10 Motor vehicle
11 Border
12 Road
13 Road
14 Road
15 Navigation route
16 Route segment

What is claimed is:

1. A navigation system for a motor vehicle, comprising:
at least one storage device, at least one navigation map being stored on each of the at least one storage device;
a reading device, each of the at least one storage device being read out by the reading device;
a changeover device for the reading device, the changeover device exchanging the at least one storage device to be read out by the reading device;
at least one display device for displaying at least one of a navigation map, a pictogram and information regarding an instantaneous position of the motor vehicle to a vehicle occupant;
a control device for the changeover device to control the changeover device so that a point in time for changing over the at least one storage device is identifiable so that during a changeover operation of the at least one storage device, a deviation of the motor vehicle from a route segment currently being traveled is improbable based on current navigation data of the motor vehicle;
wherein there is a changeover operation between data when the vehicle crosses a border of a navigation map,
wherein it is certain that a vehicle position on a second digital map has been found and the route is determinable, and
wherein from a navigation route of the motor vehicle identified by the navigation system, a turn-free route segment of the navigation route is determined, wherein from a length of the turn-free route segment and a maximum speed permissible for that route segment, a navigation time of the motor vehicle on the route segment is determined, and the ascertained navigation time of the motor vehicle is compared with a time required for a changeover operation of the storage device, and wherein the changeover operation is initiated when the ascertained navigation time is greater than the time required for the changeover operation.

2. A method for operating a navigation system for a motor vehicle, the method comprising:

displaying navigation map data, which are stored on a storage device together with navigation data of the motor vehicle, for a vehicle occupant;

performing a changeover of a storage device when the motor vehicle, as a result of its motion, moves out of a region of the navigation map that is stored on the storage device currently being used by the navigation system; and selecting a point in time for the changeover of the storage device so that during a changeover operation of the storage device, a deviation of the motor vehicle from a route segment currently being traveled is improbable based on current navigation data of the motor vehicle;

wherein there is a changeover operation between data when the vehicle crosses a. border of a navigation map, wherein it is certain that a vehicle position on a second digital map has been found and the route is determinable, and wherein from a navigation route of the motor vehicle identified by the navigation system, a turn-free route segment of the navigation route is determined, wherein from a length of the turn-free route segment and a maximum speed permissible for that route segment, a navigation time of the motor vehicle on the route segment is determined, and the ascertained navigation time of the motor vehicle is compared with a time required for a changeover operation of the storage device, and wherein the changeover operation is initiated when the ascertained navigation time is greater than the time required for the changeover operation.

3. The method of claim 2, wherein after the changeover operation of the memory device, a position of the motor vehicle that was matched using an old navigation map that is stored on the changed-out storage device is used for placing the navigation data of the motor vehicle onto a new navigation map that is stored on the changed-in storage device.

4. The method of claim 2, wherein after the changeover operation of the storage device, a position of the motor vehicle that continued to be matched during the changeover operation is used for placing the navigation data of the motor vehicle onto a new navigation map that is stored on the changed-in storage device.

5. The method of claim 2,
wherein after the changeover operation of the memory device, a position of the motor vehicle that was matched using an old navigation map that is stored on the changed-out storage device is used for placing the navigation data of the motor vehicle onto a new navigation map that is stored on the changed-in storage device.

6. The method of claim 2,
wherein after the changeover operation of the storage device, a position of the motor vehicle that continued to be matched during the changeover operation is used for placing the navigation data of the motor vehicle onto a new navigation map that is stored on the changed-in storage device.

* * * * *